3,335,164
ESTERS OF KETOPHENOLS
Otto Scherer, Bad Soden, Taunus, and Hans Habicht, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Nov. 12, 1963, Ser. No. 323,060
10 Claims. (Cl. 260—456)

The present invention relates to fungicides and a process for making them.

It is known to control mildew fungi (Erisyphaceen) on cultivated plants by using sulfur formulations in the form of powders or sprays. Recently, dinitro-alkylphenol esters in which the alkyl group is in the ortho-position, for example 4,6-dinitro-2-methyl-heptyl-phenyl crotonate, have also been proposed as effective substances for controlling mildew.

As is known, however, sulfur formulations have the great drawback that they have only a poor effect and are inappropriate for the treatment of various important cultivated plants, for example in fruit culture, since they cause roughening of the peel of the fruit. Dinitro-alkylphenol esters are effective against mildew. They are, however, relatively phytotoxic and can be used only for some species of cultivated plants. Their most essential disadvantage is their toxicity to warm-blooded animals which is probably due to the presence of the two nitro groups in the molecule.

The present invention relates to new ketophenols and their esters of the following formula

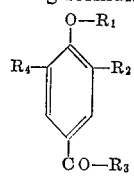

in which $R_1$ represents a hydrogen atom, a nitrophenylsulfonyl group, an acyl group with 2 to 5 carbon atoms, the group $CO.CH_2.S.CH_3$ or $CO.CH_2.S.C_2H_5$ or a benzoyl radical which may be substituted by chlorine, $R_2$ stands for an alkyl group with 1 to 4 carbon atoms, $R_3$ stands for an alkyl group with 1 to 4 carbon atoms, the group $CH_2$—$S$—$C_2H_5$ or an alkenyl radical with 2 to 4 carbon atoms, and $R_4$ stands for a hydrogen atom or an alkyl group with 1 to 4 carbon atoms.

It has been found that the compounds of the invention have an excellent fungicidal action.

The manufacture of the compounds of the invention and their use for controlling diseases caused by fungi are described in more detail as follows:

The compounds of the invention can be obtained, for example, according to the following reaction equation in which $R_1$ to $R_4$ have the meanings given above:

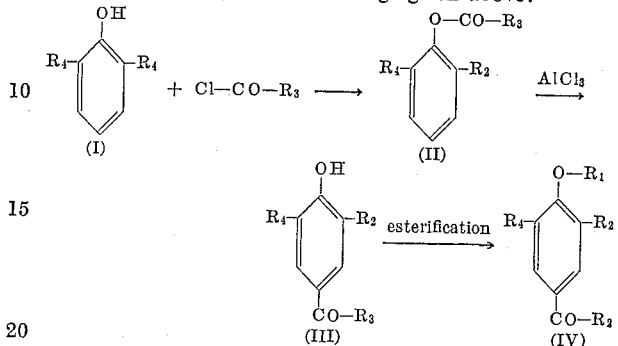

The corresponding alkyl phenols (I) obtainable in known manner are esterified by known processes and the esters so obtined (II) are subjected to a so-called Fries' reaction. The latter may be carried out with an excess of aluminum chloride in the absence of a solvent or in the presence of the common Friedel-Crafts' solvents, for example nitrobenzene, at a temperature within the range of 20 to 150° C., advantageously 40 to 80° C. After working up and removing the solvent, if necessary, the ketophenols so obtained (III) may be purified by distillation, recrystallization or recrystallization of their sodium salts.

The ketophenols thus purified generally constitute colorless, crystalline and sometimes oily substances. If desired, they may be esterified with the corresponding acid chlorides according to known methods, advantageously in the presence of tertiary amines. By proceeding in this manner compounds (IV) are obtained.

As will be seen from the Examples given below, the compounds of the invention or the fungicides containing them have an excellent action on mildew fungi and downy mildew, for example Peronospora viticola on vine plants. Their excellent action on downy mildew is particularly surprising since dinitro-alkylphenol esters have no or only a completely insignificant action on downy mildew, and sulfur formulations are also substantially ineffective against it.

The following list indicates some of the compounds obtained in accordance with the invention.

| | Melting point in °C. | Boiling point in °C. |
|---|---|---|
| 2-sec.butyl-4-acetylphenol | 129 to 131° | 155°/0.4. |
| Isobutyric acid-(2-sec.butyl-4-acetyl)-phenyl ester | Colorless oil | 141°/0.6. |
| 2,4-dichlorobenzoic acid-(2-sec.butyl-4-acetyl)-phenyl ester | Thick oil | 214°/1.2. |
| 2-sec.butyl-4-propionylphenol | 110 to 112° | 170°/1.0. |
| β,β-Dimethylacrylic acid-(2-sec.butyl-4-propionyl)-phenyl ester | Oil | 163°/2.0. |
| 2-sec.butyl-4-n-butyrylphenol | 96 to 97° | 170 to 175°/1.0. |
| 2-sec.butyl-4-isobutyrylphenol | 88 to 89° | 172°/0.8. |
| S-methyl-thioglycolic acid-(2-sec.butyl-4-isobutyryl)-phenyl ester | Light yellow oil | 169°/1.1. |
| m-Nitrobenzene-sulfonic acid-(2-sec.butyl-4-isobutyryl)-phenyl ester | Light brown syrup. | |
| β,β-Dimethylacrylic acid-(2 sec.butyl-4-isobutyryl)-phenyl ester | Light yellow thick oil. | 155°/0.7. |
| 2-sec.butyl-4-crotonylphenol | Solidified | 184 to 188°/1.2. |
| 2-sec.butyl-4-(β,β-dimethyl)-acrylylphenol | 91 to 93° | 190 to 195°/1.5. |
| 2-methyl-4-(β,β-dimethyl)-acrylylphenol | 129 to 131° | |
| S-ethylthioglycolic acid-(2-sec.butyl-4-dimethyl-acrylyl)-phenyl ester | Light brown oil | 207°/2. |
| β,β-Dimethylacrylic acid-(2-sec.butyl-4-dimethyl-acrylyl)-phenyl ester | Orange thick oil | 200°/3. |
| Isobutyric acid-(2-sec.butyl-4-dimethyl-acrylyl)-phenyl ester | Orange oil | 168°/0.8. |
| 2-sec.butyl-4-ethylmercaptoacetyl-phenol | Oil | 200 to 205°/1.5. |
| Acetic acid-(2-sec.butyl-4-ethylmercapto-acetyl)-phenyl ester | Oil | 178 to 180°/1.2. |
| 2,6-di-sec.butyl-4-acetylphenol | 77 to 78° | 182 to 185°/2.0. |

The following examples serve to illustrate the invention but they are not intended to limit it thereto.

Example 1.—2-sec.butyl-4-n-butyrylphenol 900 grams (6 mols) 2-sec.butylphenol were heated to 150° C., while stirring. At that temperature 650 grams n-butyric acid chloride were added drop by drop within 2 hours. The mixture was heated for a further hour at 150° C., then cooled to 100° C. and the excess of acid chloride was removed at 100° C. under a water-jet vacuum.

The colorless ester remaining behind (1320 grams) was distilled with an almost quantitative yield at 135° C. under a pressure of 12 millimeters of mercury.

330 grams (1.5 mols) of the crude ester so obtained were added dropwise at 40° C. within 45 minutes to a solution of 250 grams $AlCl_3$ in 375 grams nitrobenzene and the mixture was then stirred for a further 4 hours at 80° C.

The reaction solution was introduced, while stirring, into a mixture of ice and dilute hydrochloric acid, the oil was taken up in methylene chloride, the solvent and the nitrobenzene were distilled off and the ketophenol was distilled. The ketophenol boiled at 170 to 175° C. under a pressure of 1 millimeter of mercury and solidified in the form of colorless crystals. The yield amounted to 242 grams. The melting point was 96 to 97° C. (cyclohexane).

Example 2.—2-sec.butyl-4-acetylphenol 300 grams (2 mols) 2-sec.butylphenol were heated to 150° C. and 200 grams acetyl chloride were added dropwise within 1 to 2 hours. The mixture was stirred for a further hour at 150° C., then cooled to 100° C. and the excess acid chloride was distilled off at 100° C. in vacuo.

The ester left behind (380 grams) was worked up as crude product and added dropwise within 2 hours to a solution of 330 grams $AlCl_3$ in 1 litre nitrobenzene. The mixture was stirred for a further 24 hours at 50° C.

After working up with ice and hydrochloric acid, the nitrobenzene was distilled off with steam. The crystalline ketophenol left behind was suction-filtered and recrystallized from cyclohexane. The yield amounted to 330 grams (87%) of 2-sec.butyl-4-acetylphenol melting at 129 to 131° C.

Example 3.—Isobutyric acid-(2-sec.butyl-4-acetyl)-phenyl ester 96 grams 2-sec.butyl-4-acetylphenol (0.5 mol) were heated under reflux with 65 grams isobutyric acid chloride and 300 cc. benzene. 50 grams pyridine were added dropwise within 1 hour and subsequently the reaction mixture was boiled for 2 hours under reflux. After the salt had been removed by suction-filtration, the solution was washed with an acid and then with an alkaline agent, the solvent was distilled off and the product so obtained was distilled at 141° C. under a pressure of 0.6 millimeter of mercury.

The yield amounted to 97 grams isobutyric acid-(2-sec.butyl-4-acetyl)-phenyl ester.

Example 4

Wheat plants in a greenhouse were infested in the 3-leave stage with a conidia suspension of *Erysiphe graminis* and sprayed three days later with a spray liquor which contained 0.5% of active substance and had been prepared from a wettable powder of the following composition:

| | Percent |
|---|---|
| Isobutyric acid-(2-sec.butyl-4-acetyl)-phenyl ester | 15 |
| Active silicic acid [1] | 20 |
| Aluminum magnesium silicate [1] | 54 |
| Dried sulfite cellulose liquor as dispersing agent | 10 |
| Oleyl methyl tauride as wetting agent | 1 |

[1] As absorbent and grinding auxiliary agent.

An infestation with wheat mildew was safely prevented.

Examples 5 to 11

The same effect as in Example 4 was obtained by using as the active substance one of the following substances, while otherwise using the formulation of Example 4:

(5) 2,4-dichlorobenzoic acid-(2-sec.butyl-4-acetyl)-phenyl ester
(6) 2-sec.butyl-4-isobutyryl-phenol
(7) m-nitrobenzene-sulfonic acid-(2-sec.butyl - 4 - isobutyryl)-phenyl ester
(8) 2-sec.butyl-4-n-butyryl-phenol
(9) S-methyl-thioglycolic acid-(2-sec.butyl-4-isobutyryl)-phenyl ester
(10) S-ethyl-thioglycolic acid-(2-sec.butyl - 4 - dimethylacrylyl)-phenyl ester
(11) 2-sec.butyl-4-crotonylphenol

Example 12

Wheat plants in a greenhouse were sprayed in the 3-leave stage with a spray liquor which contained 0.12% of active substance and had been prepared from a wettable powder of the following composition:

| | Percent |
|---|---|
| 2-sec.butyl-4-(ethyl-mercapto-acetyl)-phenol | 15 |
| Active silicic acid | 20 |
| Aluminum magnesium silicate | 54 |
| Dried sulfite cellulose liquor | 10 |
| Oleyl methyl tauride | 1 |

Attempts made three days later to infest the plants with a suspension of spores of brown rust of wheat (*Puccinia triticina*) failed.

Example 13

An infestation with brown rust of wheat was also prevented by using a formulation containing acetic acid-(2-sec.butyl-4-ethyl-mercaptoacetyl)-phenyl ester as the active substance, while otherwise proceeding as described in Example 12.

Example 14

Wheat plants in the 3-leave stage were strongly infested with a conidia suspension of wheat mildew fungus (*Erysiphe graminis*) and sprayed three days later with 2-methyl-4-dimethyl-acrylylphenol in concentrations of 200, 100 and 50 milligrams, respectively, of active substance per liter of a spray liquor which constituted an aqueous suspension of a wettable powder consisting of 15% of active substance, 20% of active silicic acid, 54% of aluminum magnesium silicate, 10% of dried sulfite cellulose liquor and 1% of oleyl methyl tauride.

Four weeks after that treatment the wheat plants were examined for infestation with wheat mildew. The results ascertained are indicated in Table I given below which shows that the plants treated with 2-methyl-4-dimethyl-acrylylphenol were infested to a much lesser degree with mildew fungus than the comparison wheat plants treated with wettable sulfur.

An examination carried out six weeks after the infestation still showed the superiority of the active substance of the invention over the comparison formulation.

TABLE I

| Formulation | Infestation with mildew in percent four weeks after treating with mg. active substance per liter spray liquor | | | Infestation with mildew in percent six weeks after treating with mg. active substance per liter spray liquor | | |
|---|---|---|---|---|---|---|
| | 200 | 100 | 50 | 200 | 100 | 50 |
| 2-methyl-4-dimethylacrylylphenol | 1.8 | 15.9 | 49.2 | 13.4 | 51.2 | 72.3 |
| Wettable sulfur | 35.7 | 63.9 | 76.2 | 54.6 | 81.5 | 90.3 |
| Untreated | 100 | 100 | 100 | 100 | 100 | 100 |

*Example 15*

Vine plants in the 4-leave stage were strongly infested with conidia of Oidium. Five days after the infestation the plants were treated with 2-sec.butyl-4-acetylphenol in concentrations of 200, 100, 50 and 25 milligrams, respectively, of active substance per liter of spray liquor (analogous to Example 14).

For comparison, a commercial wettable sulfur formulation was used in the same amounts calculated on the sulfur as the active substance.

Four weeks after the treatment the vine plants were examined for infestation with Oidium. The results ascertained are indicated in the following Table II which shows that 2-sec.butyl-4-acetylphenol substantially almost prevented an infestation with Oidium and was more effective than wettable sulfur.

TABLE II

| Formulation | Infestation with oidium in percent with a concentration of mg. active substance per liter spray liquor | | | |
|---|---|---|---|---|
| | 200 | 100 | 50 | 25 |
| 2-sec.butyl-4-acetylphenol | 0.3 | 1.2 | 7.3 | 10.8 |
| Wettable sulfur | 25.0 | 32.6 | 53.0 | 78.4 |
| Untreated | 100 | 100 | 100 | 100 |

*Example 16*

Vine plants in the 3-leave stage were infested with a conidia suspension of wheat mildew fungus (*Erysiphe graminis*) and treated five days later with the compounds 2-sec.butyl-4-propionylphenol, 2-sec.butyl-4-n-butyrylphenol and 2-sec.butyl-4-dimethyl-acrylylphenol, respectively, in concentrations of 200, 100, 50, 25 and 12.5 milligrams, respectively, of active substance per liter of spray liquor (analogous to Example 14).

As a comparison formulation, wettable sulfur was used in the same amounts calculated on the sulfur as the active substance.

The test results ascertained after 4 weeks are indicated in the following Table III which shows that the compounds of the invention were more effective than sulfur and had a good infestation-reducing action even when used in only slight amounts.

TABLE III

| Formulation | Percent of infestation with mildew 4 weeks after treating with a concentration of mg. active substance per liter spray liquor | | | | |
|---|---|---|---|---|---|
| | 200 | 100 | 50 | 25 | 12.5 |
| 2-sec. butyl-4-propionylphenol | 0.8 | 1.9 | 8.3 | 29.3 | 43.7 |
| 2-sec. butyl-4-n-butyrylphenol | 0.2 | 1.2 | 7.5 | 18.4 | 36.5 |
| 2-sec. butyl-4-dimethyl-acrylyl-phenol | 1.2 | 3.4 | 11.4 | 32.6 | 61.3 |
| Wettable sulfur | 29.0 | 36.2 | 59.8 | 76.2 | 87.5 |
| Untreated | 100 | 100 | 100 | 100 | 100 |

*Example 17*

Vine plants in the 3-leave stage were infested with a conidia suspension of wheat mildew fungus (*Erysiphe graminis*) and treated three days later with dimethyl-acrylic acid-(2-sec.butyl-4-propionyl)-phenyl ester in concentrations of 200, 100, 50 and 25 milligrams, respectively, of active substance per liter of spray liquor (analogous to Example 14).

For comparison, wettable sulfur was used in the same amounts calculated on the sulfur.

Four weeks after the treatment the plants were examined for infestation with wheat mildew. The results ascertained are indicated in the following Table IV which shows that the dimethyl-acrylic acid-(2-sec.butyl-4-propionyl)-phenyl ester was more effective than the commercial wettable sulfur formulation.

TABLE IV

| Formulation | Percent of infestation with mildew with a concentration or mg. active substance per liter of spray liquor | | | |
|---|---|---|---|---|
| | 200 | 100 | 50 | 25 |
| Dimethyl-acrylic acid-(2-sec.butyl 4-propionyl)-phenyl ester | 3.5 | 10.4 | 26.5 | 43.2 |
| Wettable sulfur | 27.0 | 38.5 | 51.4 | 73.2 |
| Untreated | 100 | 100 | 100 | 100 |

*Example 18*

Cucumber plants in the 2-leave stage were infested with a conidia suspension of *Erysiphe cichoriacearum* and sprayed three days later with 4-acetyl-2,6-dibutylphenol in concentrations of 200, 100, 50 and 25 milligrams, respectively, of active substance per liter of spray liquor (analogous to Example 14).

For comparison, wettable sulfur was used in the same concentrations on the sulfur.

Four weeks after the treatment, the plants were examined for infestation with cucumber mildew. The results ascertained are indicated in the following Table V which shows that the 4-acetyl-2,6-dibutylphenol was more effective than the wettable sulfur.

TABLE V

| Formulation | Percent of infestation with mildew after treatment with a concentration of mg. active substance per liter spray liquor | | | |
|---|---|---|---|---|
| | 200 | 100 | 50 | 25 |
| 4-acetyl-2,6-dibutyl-phenol | 8.5 | 13.7 | 31.4 | 53.2 |
| Wettable sulfur | 27.6 | 35.4 | 42.6 | 73.1 |
| Untreated | 100 | 100 | 100 | 100 |

*Example 19*

In a greenhouse grape vines of the species Silvaner growing in pots were treated in the 4-leave stage with 4-acetyl-2,6-dibutylphenol in concentrations of 100, 50, 25, 12, 6 and 3 milligrams, respectively, of active substance per liter of spray liquor (analogous to Example 14) and after the residual deposit of spray liquor had dried the plants were infested with a concentrated suspension of *Peronospora sporangia*.

For comparison, vine plants were sprayed in the same manner with formulations on the basis of 4,6-dinitro-2-methyl-heptylphenyl crotonate in one instance and with a commercial wettable sulfur formulation in another instance and subsequently infested.

The results ascertained are indicated in the following Table VI which shows that only the compound obtained by the process of the invention, 4-acetyl-2,6-dibutylphenol, had a relatively good action on Peronospora, whereas the comparison formulations were substantially ineffective.

TABLE VI

| Formulation | Percent of infestation with Peronospora with a concentration of mg. active substance per liter spray liquor | | | | | | | |
|---|---|---|---|---|---|---|---|---|
| | 100 | 50 | 25 | 12.0 | 6.0 | 3.0 | 1.5 | 0.75 |
| 4-acetyl-2,6-dibutylphenol | 0 | 0 | 1.6 | 11.0 | 19.0 | 84 | 100 | 100 |
| 4,6-dinitro-2-methyl-heptyl-phenyl crotonate | 1.6 | 22 | 66 | 100 | 100 | 100 | 100 | 100 |
| Wettable sulfur | 2.0 | 25.0 | 68 | 87 | 100 | | | |
| Untreated | 100 | 100 | 100 | 100 | 100 | 100 | 100 | 100 |

We claim:
1. 2,4 - dichlorobenzoic acid - (2-sec.butyl-4-acetyl)-phenyl ester.
2. β,β-dimethylacrylic acid-(2-sec.butyl-4-propionyl)-phenyl ester.
3. S - methyl-thioglycolic acid-(2-sec.butyl-4-isobutyryl)-phenyl ester.
4. m - nitrobenzene-sulfonic acid-(2-sec.butyl-4-isobutyryl)-phenyl ester.
5. β,β-dimethylacrylic acid-(2-sec.butyl-4-isobutyryl)-phenyl ester.
6. S - ethyl-thioglycolic acid-(2-sec.butyl-4-dimethylacrylyl)-phenyl ester.
7. β,β - dimethylacrylic acid - (2-sec.butyl-4-dimethylacrylyl)-phenyl ester.
8. Isobutyric acid - (2 - sec.butyl-4-dimethylacrylyl)-phenyl ester.
9. 2-sec.butyl-4-ethylmercaptoacetyl-phenol.
10. Acetic acid - (2-sec.butyl-4-ethylmercaptoacetyl)-phenyl ester.

References Cited

UNITED STATES PATENTS

| | | | |
|---|---|---|---|
| 1,745,507 | 2/1930 | Schaffer | 260—592 |
| 2,419,516 | 4/1947 | Bloom et al. | 260—619 |
| 2,567,839 | 9/1951 | Britton et al. | 260—456 |
| 2,949,482 | 8/1960 | Sims et al. | 260—456 |
| 3,184,379 | 5/1965 | Lukes et al. | 260—592 X |

FOREIGN PATENTS 866,570    5/1941    France.

OTHER REFERENCES

Auwers et al.: C. A., volume 21, p. 11174 (1927).
Auwers et al.: Ann. der. Chem., volume 483, pp. 44, 49, 51, 52, 56, 57 and 62 (1930).
Bonner et al.: Tetrahedron, volume 18, pp. 1295, 1300, 1308 (1962).
Coulthard et al.: J. Chem. Soc. (London), volume of 1930, pp. 280 to 291.
Cullinane et al.: J. Chem. Soc. (London), volume of 1958, pp. 2926 to 2929.
Cullinane et al.: J. Applied Chem. (London), volume 9, pp. 133–6.
Ershov et al.: C. A., volume 59, p. 499F (1963).
Geiger: Arch. Biochem., volume 16, pp. 423, 427 (1948).
Hey et al.: J. Chem. Soc. (London), volume of 1955, pp. 2753–2755.
Marvell et al.: J. Am. Chem. Soc., volume 76, pp. 1922 to 1926 (1954).
McCoubrey: J. Pharm. Pharmacol., volume 8, pp. 648–652 (1956).
Scrocco et al.: C. A., volume 49, p. 7979F (1955).
Weiss et al.: J. Am. Chem. Soc., volume 71, pp. 2647–2649 (1949).
Wittig et al.: Ann. der. Chem., volume 446, pp. 155, 201 (1925).

CHARLES B. PARKER, *Primary Examiner.*

FLOYD D. HIGEL, *Assistant Examiner.*